United States Patent [19]

Allen et al.

[11] 4,210,205
[45] Jul. 1, 1980

[54] SECONDARY RECOVERY PROCESS

[75] Inventors: Joseph C. Allen, Bellaire; Jack F. Tate, Houston, both of Tex.

[73] Assignee: Texaco Inc., White Plains, N.Y.

[21] Appl. No.: 908,172

[22] Filed: May 22, 1978

[51] Int. Cl.$^2$ .............................................. E21B 43/27
[52] U.S. Cl. .................................... 166/271; 166/307; 252/8.55 C
[58] Field of Search .................. 252/8.55 C; 166/271, 166/307; 526/264

[56] References Cited

U.S. PATENT DOCUMENTS

| | | | |
|---|---|---|---|
| 2,596,137 | 5/1952 | Fast | 252/8.55 X |
| 3,679,000 | 7/1972 | Kaufman | 252/8.55 X |
| 3,749,169 | 7/1973 | Tate | 166/271 |
| 3,791,446 | 2/1974 | Tate | 252/8.55 X |
| 3,916,994 | 11/1975 | Maddox et al. | 166/271 |
| 3,923,666 | 12/1975 | Dill | 252/8.55 |

Primary Examiner—Herbert B. Guynn

Attorney, Agent, or Firm—Carl G. Ries; Thomas H. Whaley; Walter D. Hunter

[57] ABSTRACT

Significant improvement in the recovery of hydrocarbons from a subterranean hydrocarbon-bearing calcareous formation is accomplished by injecting into the formation via an injection well drilled into a formation communicating with an adjacent producing well and containing acid-soluble components which may or may not have water-sensitive clays and shales included therein, a composition comprising an aqueous solution of a mineral acid having dissolved therein a small amount of a vinylpyrrolidone terpolymer solution whereupon the acid solution reacts with the acid-soluble components of the formation creating passageways or enlarging existing passageways thus facilitating the flow of fluids therein and thereby increasing the recovery of hydrocarbons from the formation through the adjacent producing well. Optionally, the injected composition may be saturated with natural gas at the injection pressure.

9 Claims, No Drawings

SECONDARY RECOVERY PROCESS

FIELD OF THE INVENTION

This invention relates to a process for the recovery of hydrocarbons from subterranean hydrocarbon-bearing formations containing acid-soluble components in which the permeability and porosity of the formation communicating between the producing well and adjacent injection well are increased by treating with an acidic aqueous polymer solution thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing mediums include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many carbonate formations after only a minimal amount of the oil-in-place has been produced.

One of the remedial measures that has been used frequently to increase water-injectivity in carbonate formations is acid-treating of injection wells to improve the permeability surrounding the injection well bore, and thereby increasing the flow capabilities of the formation in the vicinity of the injection well bore. These measures, however, may result in only a temporary response in production improvement.

In acidizing an injection well utilizing the commonly employed procedure a non-oxidizing mineral acid, such as hydrochloric acid, sulfuric acid, etc., is introduced into the injection well, and through the application of sufficient pressure is forced into the adjacent formation, where it reacts with the acid-soluble components, particularly the carbonates to dissolve them, thereby increasing the permeability of the formation adjacent the bore of the injection well. Since these strong acids have almost instantaneous rates of reaction with carbonates, the acid, therefore, necessarily spends itself in the formation immediately adjacent the injection well bore so that little beneficial effect is realized at any great distance from the well bore within the formation under treatment. Also, the strong acids may cause channeling between injection and producing wells, cavitation and eventual collapse of the formation immediately adjacent the injection well bore due to excessively rapid action of the acid. Further, subsurface equipment may be damaged severely by strong acid attack.

One method suggested to overcome the above-mentioned disadvantages has been the use of "retarded" acids which consist of a mineral acid and an additive which emulsifies the acid, a combination of which affects the acidization rate. Although such emulsified mixtures can be displaced into the formation before substantial reaction occurs, such compositions have the inherent disadvantage in that when the emulsion breaks and they do react, they usually react swiftly, often unpredictably and without substantially resolving the problem of cavitation and channeling.

The primary object of the present invention is to provide a process for the improved recovery of fluids and especially hydrocarbons from subterranean fluid-bearing formations by providing a process wherein a composition comprising an acidic aqueous solution of a vinylpyrrolidone polymer is injected into a formation communicating between a producing well and an adjacent injection well, said formation containing acid-soluble components and in some instances also containing water-sensitive clays or shales, and whereafter the acid contained in the said composition reacts with the acid-soluble components of the formation to increase permeability and porosity of the formation thereby facilitating the flow of fluids therethrough.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing acid-soluble components which may or may not have water-sensitive clays included therein, a composition comprising an acidic aqueous solution of a vinylpyrrolidone polymer which is capable of reacting with the acid-soluble components at a reduced rate and which, if clays or shales are present, is capable of diminishing imbibition of water by the clays or shale and thereby inhibiting plugging or other damage due to formation swell, which acid thereof subsequently reacts with the acid-soluble components of the formation to increase the permeability and porosity thereof thereby permitting a substantial increase in the production of hydrocarbons from the formation via the production well.

A number of advantages result in treating subterranean hydrocarbon-bearing formations having acid-soluble components therein with the acidic aqueous polymer-containing compositions of this invention, namely:

1. The reaction rate of the acid with the formation acid-solubles, such as carbonates or dolomites, is greatly lessened. One of the most serious problems encountered in the use of mineral acids as acidizing agents, as previously mentioned, is the very rapid rate with which they react with such acid-solubles in the formation with the result that the acid necessarily spends itself in the formation immediately adjacent the injection well bore so that little beneficial effect is realized at any great distance from the bore within the formation under treatment.

2. The viscosity of the displacing fluid is increased. The viscosities of oil present in subsurface geologic formations and its displacing fluid are important factors in the determination of the effectiveness with which oil is pushed through the pore space of said oil-bearing formation and the degree to which the oil is permitted to stick to formation surfaces (such as sand grains) to remain as residual oil. When the displacing fluid is lower in viscosity than the oil to be displaced, the high viscosity oil preferentially sticks to the walls of pore channels and permits the low viscosity displacing fluid to move ahead. Thus, low recoveries generally are obtained from reservoirs where oil viscosity is high.

3. The injection rate of the "polymer flood" is increased. The injection rate of a viscous polymer solution, though accomplishing the advantage cited in (2) is often greater than that of water flood, at the same pressure. Acidization in-depth accomplished during flooding greatly enhances the rate of injection.

4. The cited polymer is effective in preventing swelling of water-sensitive clays or shales and thus formation damage of this type during the flooding.

DESCRIPTION OF THE INVENTION

The method of the present invention in its broadest embodiment comprises introducing via an injection well drilled into a hydrocarbon-bearing formation containing acid-soluble components and communicating with a producing well a fluid composition comprising an acidic aqueous solution of a water-soluble vinylpyrrolidone polymer in amounts sufficient to react with the formation so as to increase substantially the flow capability of the formation and to thereafter produce hydrocarbons from the said subterranean formation at an increased rate through the production well. Optionally the fluid composition injected may be saturated with natural gas at a pressure of about 300 to about 3,000 or more psig.

Preferably, the acidic aqueous treating composition of this invention injected into the hydrocarbon-bearing formation comprises an aqueous solution of about 3 to about 30 percent by weight of a non-oxidizing mineral acid, such as hydrochloric, sulfuric, etc., which contains dissolved therein between about 0.1 to about 10 percent by weight based on the total solution weight of the water-soluble vinylpyrrolidone polymer.

The acidic polymer solutions employed in the process of this invention, preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, resinamine type inhibitors, as illustrated in U.S. Pat. No. 2,758,970, may be utilized. A small but effective amount of the inhibitor is employed which generally ranges from about 0.02% to about 1.5% by weight of the acidic aqueous polymer solution.

In the first step of preparing the acidic aqueous polymer solution of this invention, a solution containing from about 3 to about 30% by weight of a non-oxidizing mineral acid, such as hydrochloric acid, in water is prepared. An inhibitor to prevent corrosion on the metal equipment associated with the wells is usually added with mixing in the next step. The required amount of the polymer is then admixed with the aqueous acid solution employing a blender whereupon the polymer dissolves at a rather rapid rate.

The process of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L. C., *Petroleum Production Engineering-Oil Field Exploitation*, Second Edition, McGraw Hill Book Company, Inc., New York, 1939, and to U.S. Pat. Nos. 3,427,318 and 3,476,182.

In conducting the process of this invention, the acidic aqueous polymer solution prepared as described above is forced, usually via a suitable pumping system, down the well bore of an injection well and into the producing formation through which it is then displaced together with hydrocarbons of the formation in the direction of a production well.

The formation may be treated continuously with polymer solution or such treatment may be temporary. If desired, however, after a time, conventional flooding may be resumed, in which case injectivity is permanently increased due to acidization in depth and sweep efficiency is increased due to the increased viscosity. The acidic aqueous polymer solution of this invention also may be applied in a modified water flood operation in which there is first injected into the well bore a slug of the acidic aqueous polymer solution which is forced under pressure into the subterranean formation. This first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

It should be understood that the concentration of the polymer and the acid may be chosen to provide a displacing fluid of the desired rheological properties. Similarly, the appropriate molecular weight polymer is selected on the basis of the formation being treated as well as other operating conditions employed.

Water-soluble vinylpyrrolidone polymers useful in preparing the novel acidizing compositions of this invention include the following terpolymers:

(A) Vinylpyrrolidone-vinyl acetate-2-acrylamido-2-methylpropanesulfonic acid, (B) Vinylpyrrolidone-hydroxyethyl acrylate-2-acrylamido-2-methylpropanesulfonic acid, and (C) Terpolymer A or B alkoxylated with from 2 to about 100 weight percent of ethylene oxide.

Terpolymer A comprises repeating units of

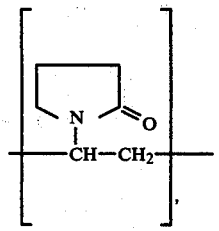

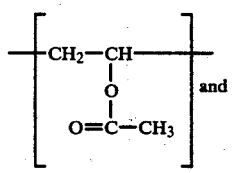
and

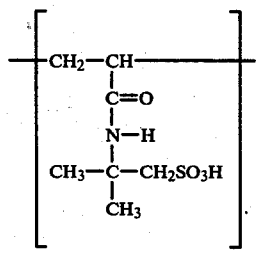

Terpolymer B comprises repeating units of

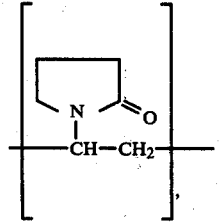

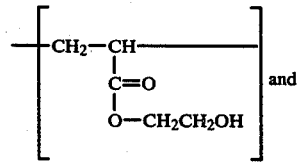
and

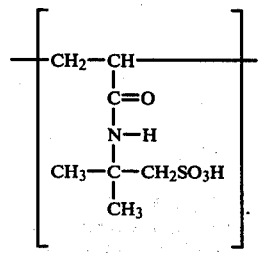

The terpolymers employed in this invention can be conveniently prepared by the usual vinyl compound polymerization methods at temperatures of about 30° to about 100° C. employing a suitable polymerization catalyst such as azo-bis-(isobutyronitrile), ammonium persulfate, etc. The preparation of such vinyl-type polymers is described in detail in numerous patents including U.S. Pat. Nos. 3,264,272, 3,779,917, 3,405,003, etc.

In Terpolymer A the weight percent of vinylpyrrolidone units will vary from about 65 to about 80, the weight percent of vinyl acetate units from about 8 to about 15 and with the balance being 2-acrylamido-2-methylpropanesulfonic acid units. Likewise in Terpolymer B the weight percent of vinylpyrrolidone units will vary from about 65 to about 80, the weight percent of hydroxyethyl acrylate units from 8 to about 15 and with the balance being 2-acrylamido-2-methylpropanesulfonic acid. Generally, the number average molecular weight of Terpolymers A and B and their alkoxylated derivatives useful in preparing the acidizing compositions of this invention will range from about 10,000 to about 2,000,000 or more and preferably will be from about 100,000 to about 400,000.

The alkoxylated terpolymers employed in preparing the acidizing compositions of this invention comprise the Terpolymer A or B alkoxylated with from about 2 to about 100 percent by weight of ethylene oxide or with a mixture of ethylene oxide and propylene oxide wherein the weight percent of ethylene oxide in the said mixture is about 60 to about 95.

The alkoxylation of such terpolymers can be conveniently conducted using methods well known in the art. For example, an aqueous solution of terpolymer comprising about 10 to about 30 weight percent or more of the terpolymer in water or the same amount of the terpolymer dispersed in toluene, xylene, etc., along with about 0.5 weight percent or more of powdered potassium hydroxide or sodium hydroxide is charged to an autoclave and the autoclave and contents heated to a temperature of about 125° to about 200° C. after which the required weight of ethylene oxide or a mixture of ethylene oxide and propylene oxide is pressured with nitrogen into the autoclave over a period of 1 to about 3 hours or more. The autoclave is allowed to cool to room temperature and then vented. The reaction product remaining after being stripped to remove volatile materials yields the water-soluble, alkoxylated terpolymer.

A number of other methods are set out in the art for conducting such alkoxylated reactions including those described in U.S. Pat. Nos. 2,2,31,477, 2,233,381; 2,131,142; 3,879,475; 2,174,761; 2,425,845 and 3,062,747.

The following example which illustrates the preparation of the alkoxylated terpolymers is to be considered not limitative.

EXAMPLE I

A total of 400 cc of xylene, 1.5 g of powdered potassium hydroxide and 65 g of terpolymer consisting of repeating units of vinylpyrrolidone, vinyl acetate and 2-acrylamido-2-methylpropanesulfonic acid (number average molecular weight of about 210,000) in particulate form are added to an autoclave and stirring is commenced in order to form a slurry or dispersion of the terpolymer and catalyst in the xylene. The autoclave and contents are then heated to a temperature of 110° C. In the terpolymer the weight percent of vinylpyrrolidone units is about 68, the weight percent of vinyl acetate units is about 14 and the balance is 2-acrylamide-2-methylpropanesulfonic acid units. Ethylene oxide in the amount of 40 g is added to the autoclave under nitrogen pressure over a 1.2 hour period during which time the temperature of the autoclave is maintained at 110° C. Next, the autoclave and contents are allowed to cool to room temperature after which the autoclave is vented. The reaction mixture is then stripped of volatiles using a nitrogen purge. The resulting water-soluble product is the vinylpyrrolidone-vinyl acetate-2-acrylamido-2-methylpropane sulfonic acid terpolymer alkoxylated with about 37 weight percent of ethylene oxide.

The following example illustrates one embodiment of this invention and is to be considered not limitative.

EXAMPLE II

Through a water injection well drilled into a limestone formation there is displaced under pressure down the tubing and into the formation an acidic aqueous polymer solution containing 1 percent by weight based on the total weight of a terpolymer consisting of 70 weight percent of vinylpyrrolidone, 18 weight percent of hydroxyethylacrylate and with the balance being 2-acrylamido-2-methylpropanesulfonic acid alkoxylated with about 9 weight percent of ethylene oxide and having an average molecular weight of 200,000 dissolved in a 7.6 weight percent of an aqueous solution of hydrochloric acid. After about 90 days the production of hydrocarbons from an adjacent producing well is substantially increased over that obtained utilizing water as the drive fluid.

What is claimed is:

1. A process for recovering hydrocarbons from a hydrocarbon-bearing formation containing acid-soluble components having at least one injection well and at least one production well penetrating the said formation and in fluid communication therewith, which comprises displacing through the formation a composition comprising an acidic aqueous polymer solution and recovering hydrocarbons through the production well, the said acidic aqueous polymer solution comprising a material selected from the group consisting of:

(I) Terpolymer A consisting of repeating units of:

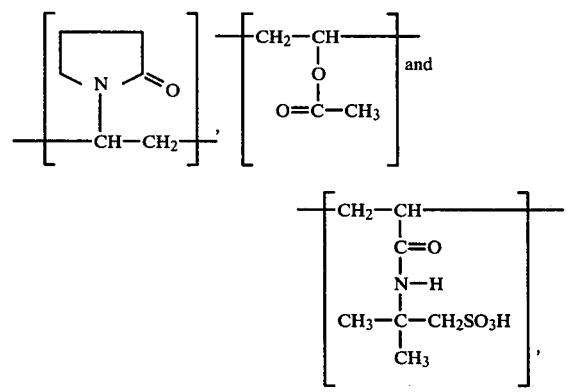

(II) Terpolymer B consisting of repeating units of

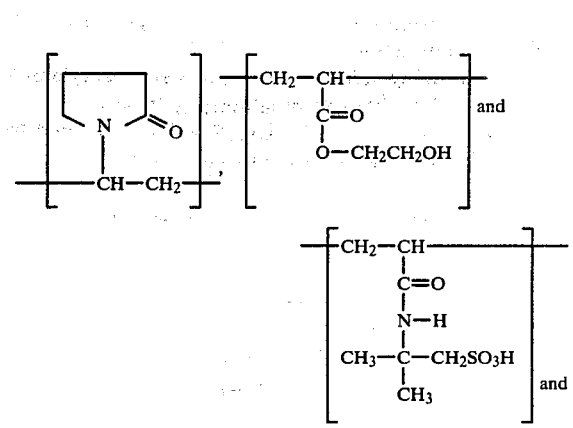

(III) Terpolymer I or II alkoxylated with about 2 to about 100 weight percent of a substance selected from the group consisting of ethylene oxide and a mixture of ethylene oxide and propylene oxide wherein in the said mixture the weight percent of ethylene oxide ranges from about 60 to about 95, the said material being dissolved in an aqueous solution of a non-oxidizing mineral acid, wherein in Terpolymer A the weight percent of vinylpyrrolidone units will vary from about 65 to about 80, the weight percent of vinyl acetate units from about 8 to about 15 with the balance being 2-acrylamido-2-methylpropanesulfonic acid, wherein in Terpolymer B the weight percent of vinylpyrrolidone units will vary from about 65 to about 80, the weight percent of hydroxyethyl acrylate units from about 8 to about 15 with the balance being 2-acrylamido-2-methylpropanesulfonic acid, wherein the said terpolymer is present in the said acidic aqueous polymer solution in a concentration of from about 0.1 to about 10 weight percent and wherein the number average molecular weight of the said terpolymer is from about 10,000 to about 2,000,000.

2. The process of claim 1 wherein the said acid is selected from the group consisting of hydrochloric and sulfuric acids.

3. The process of claim 1 wherein the said acid is hydrochloric acid.

4. The process of claim 1 wherein the said polymer is dissolved in about 3 to about 30% by weight aqueous solution of the mineral acid.

5. The process of claim 1 wherein the said composition is saturated with natural gas at a pressure of from about 300 to about 3000 psig.

6. The process of claim 1 wherein the average molecular weight of the said polymer is from about 100,000 to about 400,000.

7. The process of claim 1 wherein the said material is Terpolymer I.

8. The process of claim 1 wherein the said material is Terpolymer II.

9. The process of claim 1 wherein the said material is Terpolymer A or B alkoxylated with about 2 to about 100 weight percent of an agent selected from the group consisting of ethylene oxide and a mixture of ethylene oxide and propylene oxide wherein in the said mixture the weight percent of ethylene oxide is from about 60 to about 95.

* * * * *